United States Patent [19]

Esemplare et al.

[11] 3,967,014

[45] June 29, 1976

[54] RUBBER ARTICLES HAVING IMPROVED SLIP COATING

[75] Inventors: Pascal E. Esemplare, Mountainside, N.J.; Dennis Beeferman, Brooklyn, N.Y.

[73] Assignee: Sutures, Inc., Coventry, Conn.

[22] Filed: July 16, 1975

[21] Appl. No.: 596,529

Related U.S. Application Data

[62] Division of Ser. No. 405,863, Oct. 12, 1973, Pat. No. 3,919,442.

[52] U.S. Cl. ................................ 427/385; 2/168; 264/306
[51] Int. Cl.² ............... B32B 25/08; B32B 25/12; B32B 27/00; A41D 19/00
[58] Field of Search ............... 2/168; 264/306, 307; 427/385

[56] References Cited
UNITED STATES PATENTS 3,286,011 11/1966 Kavalier et al. ................. 264/307 X
3,298,034 1/1967 Szeguari ............................... 2/168
3,411,982 11/1968 Kavalier et al. ................. 264/307 X Primary Examiner—Michael R. Lusignan
Attorney, Agent, or Firm—Larson, Taylor and Hinds

[57] ABSTRACT

Rubber articles, such as surgeon's gloves, are provided with a synthetic resin slip coating by contacting the rubber surface with a synthetic resin latex composition. The slip coating is adherent to the rubber substrate and is very extensible without adverse effect. The synthetic resin slip coating includes from 5 to 90 percent by weight of a first resin copolymer component selected from the group consisting of vinyl chloride-alkyl acrylate copolymer, vinylidene chloride-alkyl acrylate copolymer, and vinyl acetate-alkyl acrylate copolymer, and correspondingly, from 95 to 10 percent by weight of a second resin copolymer component selected from the group consisting of vinyl chloride-vinyl ester copolymer, and vinylidene chloride-vinyl ester copolymer.

5 Claims, No Drawings

RUBBER ARTICLES HAVING IMPROVED SLIP COATING

This is a division of application Ser. No. 405,863 filed Oct. 12, 1973, now U.S. Pat. No. 3,919,442, patented Nov. 11, 1975.

BACKGROUND OF THE INVENTION

This invention relates to rubber articles having improved slip coatings and to methods of providing same. More particularly, the invention relates to rubber articles, such as sterile surgeon's gloves, which are provided with an improved slip coating. Still more particularly, the invention relates to such articles and methods wherein the slip coating is an essentially rubber-free synthetic resin layer.

It has previously been proposed to provide slip finishes on rubber articles such as rubber gloves or girdles by various methods. For example, the surface of a rubber glove can be halogenated with bromine or chlorine to make it slippery. However, this treatment may result in very poor aging properties. Discloration can begin almost immediately and, within a month, the halogenated surface may become hard and brittle and brown in color. This can be avoided only by taking great care in the halogenation process and even then there is no assurance of obtaining a uniform, sustained, slip film. Waxes and silicones have been used but these provide only a temporary solution as these materials rub off in a very short time. It has further been proposed in U.S. Pat. No. 3,286,011 issued Mar. 18, 1964, and U.S. Pat. No. 3,411,982 issued Mar. 18, 1964, to provide a slip finish comprising a rubber latex and a resin latex. While such coatings reduce the coefficient of friction of the rubber article to a slight extent, it is desirable to further reduce the coefficient of friction. For example, it is desirable to further reduce the coefficient of friction to make it easier to put on and take off a rubber article such as a rubber glove.

In our co-pending application Ser. No. 220,692, we have disclosed an excellent resin slip finish for rubber articles. The resin used is a vinyl chloride-alkyl acrylate copolymer or a vinylidene chloride-alkyl acrylate copolymer. While the slip finish is excellent, it may produce a "cobblestoning" effect when the rubber article is stretched to a large extent, of for example, over 450 percent. In surgeon's gloves, for example, stretchability of 700 percent is desired. Where gloves in accordance with our earlier invention are stretched to that extent, they tend to cobblestone, a condition which is not desirable in use.

It is an object of the present invention to provide an improved slip coating on a rubber article. It is a further object of the invention to provide improved methods of providing slip coatings on rubber articles. It is still a further object to provide a rubber article having a slip coating which substantially reduces the coefficient of friction of the rubber surface on which the coating is applied, and which can be stretched a very large amount without adverse effect.

BRIEF SUMMARY OF THE INVENTION

The foregoing and other objects which will be apparent to those having ordinary skill in the art are achieved according to the present invention by providing an article including a rubber surface provided with an essentially rubber-free extensible adherent slip coating, said slip coating being essentially rubber free and comprising from 5 to 90 percent by weight of a first resin copolymer component selected from the group consisting of vinyl chloride-alkyl acrylate copolymer, vinylidene chloridealkyl acrylate copolymer, and vinyl acetate-alkyl acrylate copolymer, and correspondingly, from 95 to 10 percent by weight of a second resin copolymer component selected from the group consisting of vinyl chloride-vinyl ester copolymer, and vinylidene chloride-vinyl ester copolymer. These slip coatings are provided according to the present invention by contacting a rubber surface with an aqueous synthetic resin latex, the synthetic resin of which comprises the alkyl acrylate copolymer and the vinyl ester copolymer, and permitting the coating thus provided to form a slip coating on the rubber surface.

DETAILED DESCRIPTION OF THE INVENTION

The rubber surface on which the slip coating is provided may be fabricated from any suitable conventional latex dipping compound such as those disclosed in U.S. Pat. No. 3,411,982. The latex may be pre-cured or non pre-cured latex in which case the rubber article is cured after forming. The latex dip may contain conventional compounding ingredients commonly utilized. Specific examples are given in U.S. Pat. No. 3,411,982. The rubber may be natural rubber or any conventional latex suitable for dipping operations. Of the various natural and synthetic latices, natural rubber, polychloroprene rubber, synthetic polyisoprene, SBR, and mixtures thereof are preferred. Conventional formulations for each of these rubbers are well known in the art and those skilled in the art are readily able to vary the formulations and conditions of curing and the like to suit the particular latex being used as well as the particular final article desired. Similarly, the article can vary widely and includes gloves, particularly surgeon's gloves, girdles, and the like.

The synthetic resin latex composition utilized according to the present invention includes a first copolymer component and a second copolymer component. The first component may be a vinyl chloride-alkyl acrylate, a vinylidene chloride-alkyl acrylate, or a vinyl acetate-alkyl acrylate copolymer. By "alkyl acrylate" is meant alkyl esters of acrylic or methacrylic acid. The alkyl group is preferably methyl, ethyl, propyl, or butyl and butyl is preferred. The copolymer includes from 10 to 90 mole percent of the vinyl chloride, vinylidene chloride, or vinyl acetate units and, correspondingly, from 90 to 10 mole percent of the acrylate units. Preferably, the former units comprise from 70 to 90 mole percent of the copolymer and the acrylate units correspondingly comprise from 30 to 10 mole percent of the copolymer. The copolymer may also include up to 5 molar percent, preferably from one half to 5 mole percent, based on the total amount of the other units, of acrylic acid or methacrylic acid units. The copolymer may also include any of the conventional vinyl resin plasticizers in amounts of generally up to about 5 mole percent. Suitable plasticizers include tricresyl phosphate, dibutyl phthalate, dibutyl sebacate, tributyl phosphate, dioctyl phthalate, trioctyl phosphate, dioctyl sebacate, dioctyl adipate, low molecular weight polymers such as poly(propylene glycol) esters, and the benzoate plasticizers such as 2-ethylhexyl-p-oxybenzoate.

The resin second component may be a copolymer of vinyl chloride or vinylidene chloride and a vinyl ester.

By "ester" is meant alkyl esters of monocarboxylic acid having from 2 to 4 carbon atoms. Suitable vinyl esters include vinyl acetate, vinyl propionate, vinyl butyrate, and the like, and vinyl acetate is preferred. The copolymer includes from 90 to 10 mole percent, preferably 40 to 60 mole percent, of the vinyl or vinylidene chloride units, and, correspondingly, from 10 to 90 mole percent, preferably 60 to 40 mole percent, of the vinyl ester units. As in the case of the first copolymer component, the second copolymer component may also contain up to 5 mole percent, preferably one half to 5 mole percent, of acrylic acid or methacrylic acid and may likewise include a conventional plasticizer in amounts of generally up to 5 mole percent.

The first resin component constitutes at least 5 percent by weight (solids basis) of the two resin components. Where the first resin component is present in an amount of less than 5 percent, stretching to a large extent will start to result in cobblestoning. Where the amount of the first resin component exceeds 90 percent by weight (solids basis) of the two resin components, the slipperiness of the coating tends to suffer. Good results are obtained when the first resin component is present in an amount of from 5 to 75 percent by weight and best results are achieved when it is present in an amount of about 20-30 percent by weight, the second component making up the balance.

The improved slip coating according to the invention is preferably provided on a rubber surface by contacting the rubber surface with an aqueous latex consisting essentially of water and the two vinyl copolymers. Alternatively, the slip coating can be first provided on a form and the form subsequently dipped into a rubber latex as disclosed in U.S. Pat. No. 3,411,982.

The slip coating provided by the present invention has excellent characteristics of slipperiness. A simple way to demonstrate the slipperiness of rubber coated according to the invention is to place two coated rubber surfaces together and rub the rubber surfaces back and forth while grasped between the fingers. Previous slip coatings which have been tested do not slip at all when held in this manner. However, the coatings provided by the present invention readily slip. Furthermore, the coatings provided by the present invention are tenaciously adhesive and the rubber substrate can be stretched to maximum extent without affecting the slipperiness of and without causing cracking of the slip coating according to the present invention. There follow examples according to the invention and examples showing coatings according to the teachings of U.S. Pat. No. 3,411,982 and of our earlier application Ser. No. 220,692. The results of the examples clearly show that the slip coating according to the present invention is remarkably more slippery than the coatings of the prior art and is remarkably more stretchable than the coating of our earlier application Ser. No. 220,692.

EXAMPLE 1

A clean glove form is first utilized to make conventional surgeon's gloves from natural rubber by dipping the form into an aqueous natural rubber latex composition made by mixing 3 parts by weight of a conventional 60% solids natural rubber latex (e.g. Lotol L 9241) in 2 parts by weight of water. Immersion of the form is fairly slow but withdrawal is rapid so that there is streaming of latex down the form. At the point where the thumb of the form starts to emerge from the latex, the form is tilted to a slight angle so that the latex runs between the thumb and first finger. At the point where the form is completely out of the latex, the form is tilted in the opposite direction. The form is then reverted to the vertical position and allowed to drain from the finger tips until no further dripping takes place. The form is then rotated so that the fingers are up. The form is then dipped into coagulant solution comprising 20% acetic acid in isopropyl alcohol, removed and allowed to dry at room temperature approximately two to three minutes. The form is again dipped into the natural rubber latex. Dwell time is 5 to 10 seconds. The dwell time in this step determines the gauge of the glove. Withdrawal of the form is done in the same manner as described above. The form is dipped into the coagulant again, removed and allowed to dry at room temperature approximately two to three minutes.

The form is now dipped into an aqueous composition made by dispersing 5 parts by weight of a 50% solids content synthetic resin latex in 4 parts by weight of water. The synthetic resin is a conventional solid synthetic resin copolymer of approximately equi-molar amounts of vinyl chloride and butyl acrylate and also containing about 3 mole percent acrylic acid units along the polymer backbone. The dwell time in the synthetic resin latex is about 30 seconds. Withdrawal of the form is done in the same manner as described above. The form is then dried for approximately 60 minutes in a forced air oven maintained between 180° and 185°F. The gloves are now stripped from the form in hot water and placed in a hot water (190° to 200°F) leaching tank for 12 to 16 hours, followed by drying at 180°–185°F for 1 hour.

The gloves are then turned inside out such that the slip coating is on the inside and are tested for slipperiness in two ways. First, the gloves are repeatedly put on and removed. Second, with the slip coating surfaces innermost, the palm area of the glove is grasped between the fingers and, with grasping pressure applied, the fingers are rubbed back and forth whereupon the inner glove surfaces, if sufficiently slippery, will slip relative to each other. This example is in accordance with our earlier application Ser. No. 220,692. The gloves are very easily put on and taken off and, in the grip test, even under heavy grasping pressure, the inner surfaces easily slip. However, when the gloves are stretched over about 450%, the film loses its extensibility and gives a cobblestoning effect.

EXAMPLES 2–17

A clean glove form is first utilized to make conventional surgeon's gloves from a natural rubber latex by placing the glove form in a forced air oven at 190°F for 20 minutes. The form is then dipped into an isopropanol solution containing 20% calcium nitrate and 5% diatomaceous earth. The calcium nitrate is the coagulant and, the diatomaceous earth is used as a release of the rubber from the form. The heated form is dipped and then removed from the coagulant bath and the alcohol is allowed to evaporate about one minute. The form is then immersed slowly and allowed to dwell for 8 seconds in the natural rubber latex and then the form is withdrawn slowly from the latex tank — the forms are then rotated in a full circle to even out the deposition of latex on the form. The coagulated rubber on the form is now immersed into a leach tank at 135°F for one half hour. The purpose for the leach tank is to leach out the surfactants and the calcium nitrate. After removal from the leach tank the excess water is shaken from the forms and the forms are dipped into the slip coating latex for 30 seconds, then removed from the dipping tank and rotated in a full circle to even out the coating. The coated form is then placed in a forced air oven at 195° for 45 minutes. The gloves are then stripped from the forms in cold water and then washed in a washing machine for 20 minutes having an overflow rate of 30 gal/hr. After washing, the gloves are then placed in a tumble dryer at 135°F for 1 hour. Results using various combinations of resins are as follows:

| Ex. | First Resin | Component Amount (parts by weight) | Second Resin | Component Amount (parts by weight) | Solids content % by weight | Slip | Extensibility |
|-----|-------------|------------------------------------|--------------|------------------------------------|----------------------------|------|---------------|
| 2   | A[1]        | 1                                  | B[2]         | 9                                  | 5                          | excellent | excellent |
| 3   | A           | 2                                  | B            | 8                                  | 5                          | ''   | ''            |
| 4   | A           | 3                                  | B            | 7                                  | 5                          | ''   | ''            |
| 5   | A           | 4                                  | B            | 6                                  | 5                          | ''   | ''            |
| 6   | A           | 5                                  | B            | 5                                  | 5                          | ''   | ''            |
| 7   | A           | 6.5                                | B            | 3.5                                | 10                         | good | ''            |
| 8   | A           | 6.5                                | B            | 3.5                                | 5                          | ''   | ''            |
| 9   | A           | 6.5                                | B            | 3.5                                | 2.5                        | ''   | ''            |
| 10  | A           | 15                                 | B            | 5                                  | 20                         | good[3] | ''         |
| 11  | A           | 15                                 | B            | 5                                  | 17.64                      | ''   | ''            |
| 12  | A           | 15                                 | B            | 5                                  | 15                         | ''   | ''            |
| 13  | A           | 15                                 | B            | 5                                  | 10                         | ''   | ''            |
| 14  | A           | 15                                 | B            | 5                                  | 5                          | ''   | ''            |
| 15  | A           | 15                                 | B            | 5                                  | 2.5                        | ''   | ''            |
| 16  | A           | 15                                 | B            | 5                                  | 1                          | ''   | ''            |
| 17  | A           | 17                                 | B            | 3                                  | 10                         | fair | ''            |

Notes.
1. Copolymer of vinylidene chloride (90 mole%) and butyl acrylate (10 mole%)
2. Copolymer of vinyl chloride (40 mole%) and vinyl acetate (50 mole%)
3. The slip of Examples 10–16 is good, but not quite as good as that of Examples 7–9

The results of Examples 2–17 show that tenaciously adherent resin slip coatings having excellent extensibility are achieved according to the present invention without the necessity of utilizing rubber in the slip coat. Elongation of over 450 percent, even over 600 percent, or 700 percent, is obtainable without adverse affect on the slip coating. As indicated above, resins other than those in the working examples can be used as the first and second resin components to give similar results. Each of the resin copolymers is preferably made up of at least 20 mole percent of each of the specified units making up the polymer chain. The first and second components may each be one or more of the specified copolymers. In the case of vinyl acetate-alkyl acrylate copolymers, these may be cross linked with a conventional cross linking agent such as N-methylol acrylamide.

In a preferred form of the invention, a surgeon's gloves are coated on both sides by simply repeating the process of Examples 2–17. These gloves are found to have excellent "feel" in use and are easily put on and taken off. Moreover, their use eliminates contact between rubber and the surgeon's hand and thus eliminates what many surgeons believe is a cause of irritation.

The thickness of the coating can be varied by simply varying the solids, in the dipping operation or by applying several coats, all of which is conventional in the art. In general, it is desired to obtain a uniform coating over the desired area of the substrate and coating will therefore, in general, be at least 0.0005 inches in thickness to achieve this end when conventional dipping techniques are utilized. Of course, if improved coating techniques are utilized, thinner coatings can be provided and will form a continuous coating. In general, therefore, the thickness of the coating will be sufficient such that, using a given coating technique, a uniform coating over the desired surface area is achieved.

What is claimed is:

1. A method of providing an adherent, extensible, essentially rubber free slip coating on a rubber surface comprising contacting a rubber surface with an aqueous synthetic resin latex essentially free of rubber and comprising from 5 to 90 percent by weight of a first resin copolymer component selected from the group consisting of vinyl chloride-alkyl acrylate copolymer, vinylidene chloride-alkyl acrylate copolymer, and vinyl acetate-alkyl acrylate copolymer and from 95 to 10 percent by weight of a second resin copolymer component selected from the group consisting of vinyl chloride-vinyl ester copolymer and vinylidene chloride vinyl ester copolymer, to provide a coating of said latex on said rubber surface, and permitting said coating to form a resin slip coating on said rubber surface.

2. A method according to claim 1 wherein said rubber surface is a surface of a sheet-like rubber article.

3. A method according to claim 2 wherein said sheet-like rubber article comprises a rubber glove.

4. A method according to claim 3 wherein said rubber glove is a sterile material rubber surgeon's glove.

5. A method according to claim 4 wherein both the inside surface and the outside surface of said glove are provided with said slip coating.

* * * * *